United States Patent
Folk et al.

(10) Patent No.: US 12,321,906 B2
(45) Date of Patent: *Jun. 3, 2025

(54) TRANSACTION STORING AND FORWARDING

(71) Applicant: Bank of America Corporation, Charlotte, NC (US)

(72) Inventors: Amy Baker Folk, Charlotte, NC (US); William Thomas Sanders, Denver, NC (US); Daniel Christopher Bohen, Charlotte, NC (US); Paul Martin Mattison, Sherrills Ford, NC (US); Shane Anthony Johnson, Charlotte, NC (US); Sandra Ruth Maas, Denver, NC (US); Kristen Ellen Asplund, Boulder, CO (US); Edward Christopher Mackey, Wading River, NY (US); Shelaine Marie Monkiewicz, Marietta, GA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/238,047

(22) Filed: Aug. 25, 2023

(65) Prior Publication Data

US 2023/0401548 A1    Dec. 14, 2023

Related U.S. Application Data

(63) Continuation of application No. 17/874,641, filed on Jul. 27, 2022, now Pat. No. 11,783,307, which is a (Continued)

(51) Int. Cl.
  *G06Q 20/10*    (2012.01)
  *G07F 19/00*    (2006.01)

(52) U.S. Cl.
  CPC ............ *G06Q 20/10* (2013.01); *G07F 19/20* (2013.01); *G07F 19/202* (2013.01); *G07F 19/203* (2013.01)

(58) Field of Classification Search
  CPC ....... G06Q 20/10; G07F 19/20; G07F 19/202; G07F 19/203
  (Continued)

(56) References Cited

U.S. PATENT DOCUMENTS

| 4,795,890 A | 1/1989 | Goldman |
| 4,803,347 A | 2/1989 | Sugahara et al. |

(Continued)

OTHER PUBLICATIONS

Jul. 20, 2010 (US) Non-Final Office Action—U.S. Appl. No. 12/183,706.

(Continued)

*Primary Examiner* — Daniel A Hess
(74) *Attorney, Agent, or Firm* — Banner & Witcoff, Ltd.

(57) ABSTRACT

After loss of communications between a cash handling device and a financial institution, transactions may continue to be processed. In one configuration, the transactions may be processed up to a predefined transaction limit. Transaction limits may be defined by a number of transactions, a dollar amount transacted or to be transacted, an amount of time and/or combinations thereof. Additionally or alternatively, the transaction limit may be specific to one or more types of transactions. Transaction data may be stored in memory until communication has been re-established, at which time the data may be transmitted to the financial institution for processing.

20 Claims, 10 Drawing Sheets

Related U.S. Application Data continuation of application No. 17/011,530, filed on Sep. 3, 2020, now Pat. No. 11,436,576, which is a continuation of application No. 16/524,940, filed on Jul. 29, 2019, now Pat. No. 10,803,429, which is a continuation of application No. 15/919,487, filed on Mar. 13, 2018, now Pat. No. 10,410,186, which is a continuation of application No. 15/375,458, filed on Dec. 12, 2016, now Pat. No. 9,971,997, which is a continuation of application No. 14/747,109, filed on Jun. 23, 2015, now Pat. No. 9,547,848, which is a continuation of application No. 12/183,706, filed on Jul. 31, 2008, now Pat. No. 9,098,960.

(58) Field of Classification Search
USPC .......................................................... 705/39
See application file for complete search history.

(56) References Cited

U.S. PATENT DOCUMENTS

| | | | |
|---|---|---|---|
| 5,773,804 | A | 6/1998 | Baik |
| 8,095,463 | B1 | 1/2012 | Hartmaier |
| 9,098,960 | B1 | 8/2015 | Folk et al. |
| 9,547,848 | B2 | 1/2017 | Folk et al. |
| 9,971,997 | B2 | 5/2018 | Folk et al. |
| 10,410,186 | B2 | 9/2019 | Folk et al. |
| 11,436,576 | B2 | 9/2022 | Folk et al. |
| 11,783,307 | B2 * | 10/2023 | Folk ..................... G07F 19/203 235/375 |
| 2004/0210519 | A1 | 10/2004 | Oppenlander et al. |
| 2005/0056693 | A1 | 3/2005 | Yokoi et al. |
| 2007/0162388 | A1 | 7/2007 | Hamilton et al. |
| 2007/0162389 | A1 | 7/2007 | Hamilton et al. |
| 2007/0187491 | A1 | 8/2007 | Godwin et al. |
| 2007/0257099 | A1 | 11/2007 | Graef et al. |

OTHER PUBLICATIONS

Dec. 23, 2010 (US) Final-Office Action—U.S. Appl. No. 12/183,706.
Sep. 7, 2011 (US) Non-Final Office Action—U.S. Appl. No. 12/183,706.
Feb. 8, 2012 (US) Final Office Action—U.S. Appl. No. 12/183,706.
Oct. 2, 20122 (US) Non-Final Office Action—U.S. Appl. No. 12/183,706.
Feb. 13, 2013 (US) Final Office Action—U.S. Appl. No. 12/183,706.
Jun. 12, 2013 (US) Non-Final Office Action—U.S. Appl. No. 12/183,706.
Dec. 11, 2013 (US) Final Office Action—U.S. Appl. No. 12/183,706.
Apr. 1, 2015 (US) Notice of Allowance—U.S. Appl. No. 12/183,706.
Jul. 1, 2016 (US) Non-Final Office Action—U.S. Appl. No. 14/747,109.
Dec. 13, 2016 (US) Notice of Allowance—U.S. Appl. No. 14/747,109.
Oct. 10, 2014 (US) Non-Final Office Action—U.S. Appl. No. 12/183,706.
Jul. 25, 2017 (US) Non-Final Office Action—U.S. Appl. No. 15/375,458.
Jan. 17, 2019 (US) Non-Final Office Action—U.S. Appl. No. 15/919,487.
May 2, 2019 (US) Notice of Allowance and Fees Due—U.S. Appl. No. 15/919,487.
Feb. 10, 2022—(US) Non-Final Office Action—U.S. Appl. No. 17/011,530.
May 18, 2022—(US) Notice of Allowance—U.S. Appl. No. 17/011,530.
Jun. 7, 2023—(US) Notice of Allowance—U.S. Appl. No. 17/874,641.
Feb. 17, 2023—(US) Non-Final Office Action—U.S. Appl. No. 17/874,641.

* cited by examiner

TRANSACTION STORING AND FORWARDING

CROSS-REFERENCE TO RELATED APPLICATIONS

This application is a continuation of and claims priority to co-pending U.S. application Ser. No. 17/874,641, filed Jul. 27, 2022, and entitled "Transaction Storing and Forwarding," which is a continuation of and claims priority to U.S. patent application Ser. No. 17/011,530, filed Sep. 3, 2020, issued as U.S. Pat. No. 11,436,576, and entitled "Transaction Storing and Forwarding," which is a continuation of and claims priority to U.S. patent application Ser. No. 16/524,940, filed Jul. 29, 2019, issued as U.S. Pat. No. 10,803,429, and entitled "Transaction Storing and Forwarding," which is a continuation of and claims priority to U.S. patent application Ser. No. 15/919,487, filed Mar. 13, 2018, issued as U.S. Pat. No. 10,410,186, and entitled "Transaction Storing and Forwarding," which is a continuation of and claims priority to U.S. patent application Ser. No. 15/375,458, filed Dec. 12, 2016, issued as U.S. Pat. No. 9,971,997, and entitled "Transaction Storing and Forwarding," which is a continuation of and claims priority to U.S. patent application Ser. No. 14/747,109, filed Jun. 23, 2015, issued as U.S. Pat. No. 9,547,848, and entitled "Transaction Storing and Forwarding," which is a continuation of and claims priority to U.S. patent application Ser. No. 12/183,706, filed Jul. 31, 2008, issued as U.S. Pat. No. 9,098,960, and entitled "Transaction Storing and Forwarding." Each of the foregoing applications is incorporated by reference herein in its entirety.

BACKGROUND

Businesses and other organizations often require a supply of cash to fund transactions such as providing change for customer purchases. In some instances, such businesses and organization use a cash handling device that provides recognition of transactions (e.g., withdrawals, deposits) by transmitting the transaction data to a financial institution. Since, in such systems, there is a reliance upon communications between the cash handling device and the financial institution, a disruption in communications may cause the cash handling device to lock down and prevent further transactions. The cash handling device may respond in such a fashion to avoid potential loss of funds or other discrepancies since the financial institution is not able to reconcile data if communications have been lost. Thus, a business or organization would not be able to access funds during the communication outage, thereby disrupting regular operations.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

According to some aspects, a store and forward mode is provided by a cash handling device so that transactions may still be conducted at the cash handling device even after communications with a financial institution have been lost. The cash handling device may be configured to allow transactions up to a certain transaction limit during a period where communications have been lost. A transaction limit may include a number of transactions, a total amount transacted, an amount of time and the like. The transaction limit(s) may be set by the financial institution, the business or organization using the cash handling device, a transport carrier or other entities. Transactions conducted during the communication failure period may be stored in memory. Upon re-establishment of communications between the cash handling device and the financial institution, the cash handling device may forward the data associated with the transactions conducted during the communication failure period to the financial institution for reconciliation, recognition and/or other processing.

According to some aspects, transaction limits may be defined for certain transaction types. Thus, in one example, withdrawals may be limited to a certain number of transactions or amount while deposits may be conducted without limit or with a different limit.

BRIEF DESCRIPTION OF THE DRAWINGS

The present disclosure is illustrated by way of example and not limited in the accompanying figures in which like reference numerals indicate similar elements.

DETAILED DESCRIPTION

Aspects of the present disclosure relate to cash handling devices. Cash handling devices generally refer to devices that are configured to accept and/or dispense currency. Cash handling devices include payment kiosks, point of sale systems such as cash registers, automated teller machines (ATMs), currency recyclers and the like. Currency recyclers generally refer to cash handling devices that are configured to dispense the same currency that was earlier deposited. For example, if a user deposits a 5 dollar bill into a cash recycler machine, the same 5 dollar bill may be dispensed during a subsequent withdrawal transaction. Thus, using currency recyclers, deposited currency may be placed immediately back into use and circulation instead of being held or frozen until a bank is able to collect and reconcile the funds, stored indefinitely and/or taken out of circulation entirely as is the case with other current cash handling devices.

Figure 1:
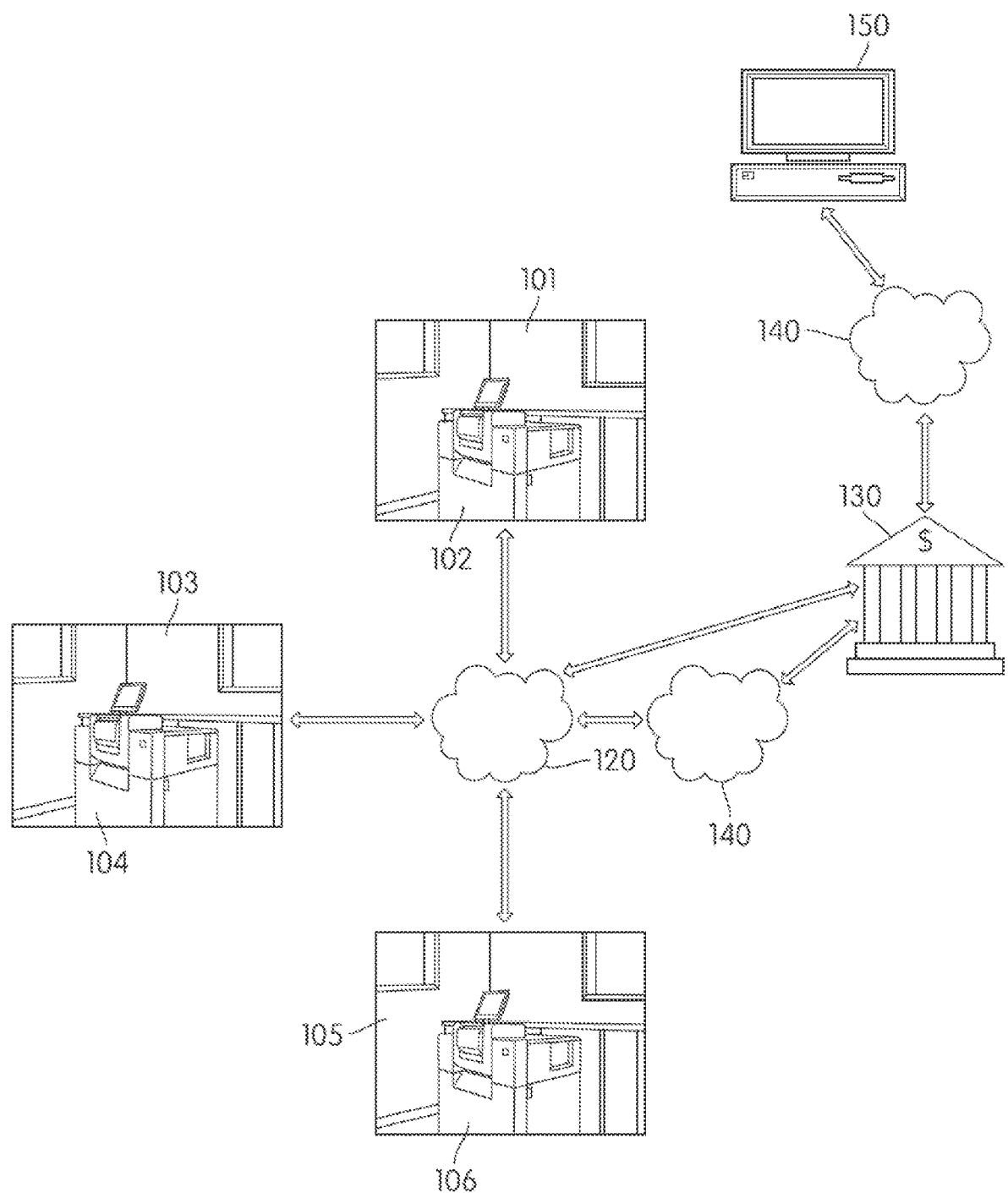
FIG. 1 illustrates an example of a suitable operating environment in which various aspects of the disclosure may be implemented.

FIG. 1 illustrates an example of a suitable operating environment in which various aspects of the disclosure may be implemented. Devices 102, 104, 106 may include currency recyclers and/or other cash handling devices and may be located at various sites such as locations 101, 103, and 105. The locations may represent different stores of a business enterprise. For example, locations 101, 103, and 105 may represent three different grocery stores located in different geographical areas belonging to a grocery store chain. Those skilled in the art will realize that additional cash handling devices may be located in the same store or in other stores belonging to the grocery store chain. In addition, those skilled in the art will realize that a grocery store chain is only one illustrative example of the types of locations or businesses that cash handling devices such as recyclers may be located. For example, cash recyclers may also be located in gas stations, post offices, department stores, and other places where cash and other financial instruments are deposited or withdrawn.

FIG. 1 further illustrates that cash handling devices 102, 104, and 106 may be connected to a communications network such as communications network 120. Communications network 120 may represent: 1) a local area network (LAN); 2) a simple point-to-point network (such as direct modem-to-modem connection); and/or 3) a wide area network (WAN), including the Internet and other commercial based network services.

Cash handling devices 102, 104, and 106 may communicate with one another or with a financial institution such as bank 130 via communication network 120 in various manners. For example, communications between cash handling devices 102, 104, 106 and bank 130 may use protocols and networks such as TCP/IP, Ethernet, FTP, HTTP, BLUETOOTH, Wi-Fi, ultra wide band (UWB), low power radio frequency (LPRF), radio frequency identification (RFID), infrared communication, IrDA, third-generation (3G) cellular data communications, Global System for Mobile communications (GSM), or other wireless communication networks or the like. Communications network 120 may be directly connected to a financial institution such as bank 130. In another embodiment, communications network 120 may be connected to a second network or series of networks 140 before being connected to bank 130. According to one or more arrangements, bank 130 may utilize an infrastructure which includes a server 150 having components such as a memory, a processor, a display, and a communication interface.

Figure 2:
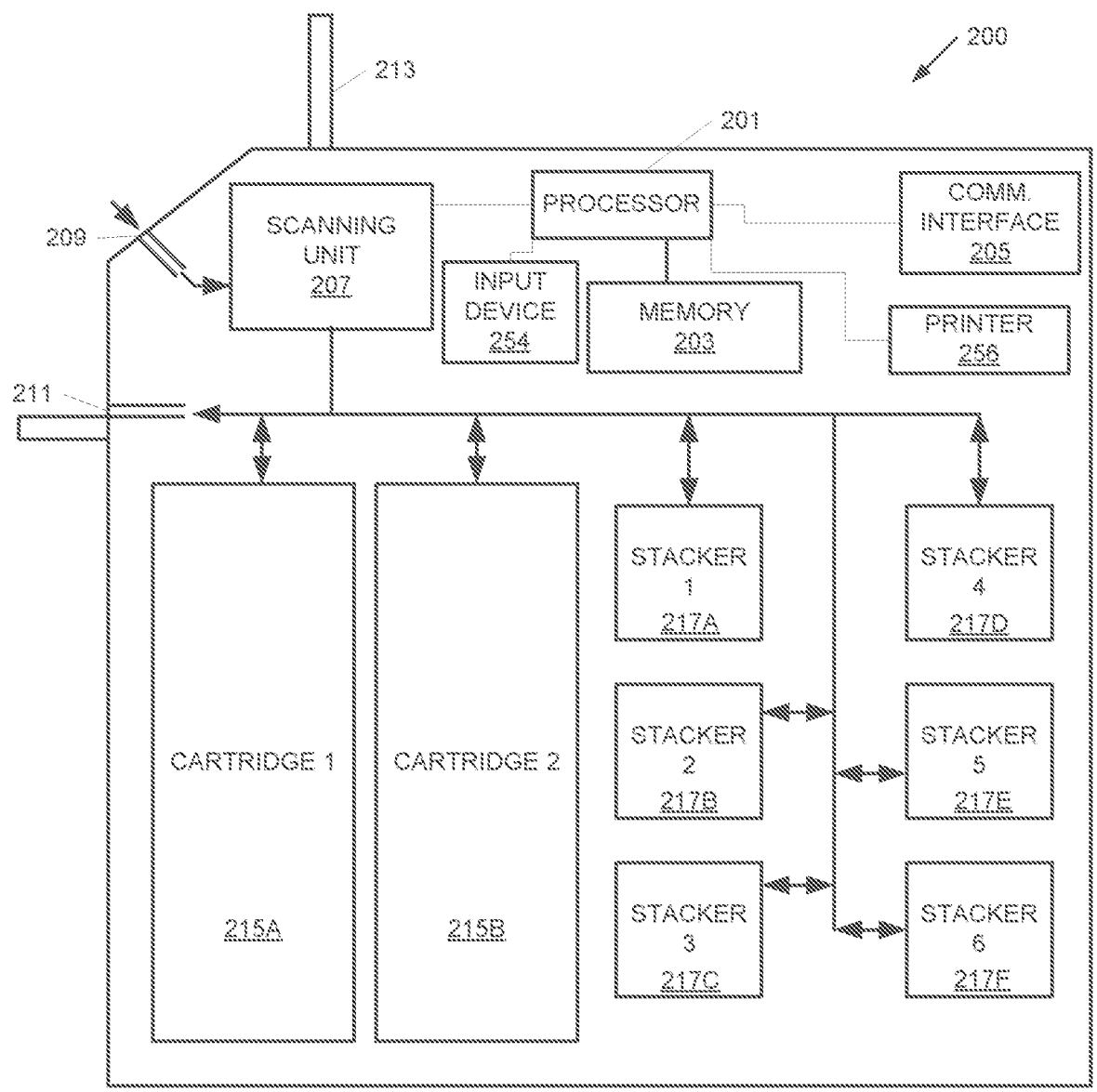
FIG. 2 illustrates a simplified diagram of a currency recycler in accordance with one or more aspects described herein.

FIG. 2 illustrates a simplified diagram of a cash recycler that may be used in accordance with the operating environment of FIG. 1. Cash recycler 200 may include processor 201, memory 203, communication interface 205, scanning unit 207, display 213 and various cartridges 215 and stackers 217. Processor 201 may be generally configured to execute computer-readable instructions stored in memory 203 such that, for example, cash recycler 200 may send and receive information to and from a bank (e.g., bank 130 of FIG. 1) using communication interface 205 and via a network (e.g., networks 120 and/or 140 of FIG. 1). Memory 203 may be configured to store a variety of information including the aforementioned computer-readable instructions, funds balance data, reconciliation data, user account information and the like. Additionally, memory 203 may include non-volatile and/or volatile memory. One or more databases may be stored in the memories 108, 112, and 116.

Cash recycler 200 may further provide display 213 to present data and/or messages to a user. For example, display 213 may be configured to display a recycler balance, a transaction interface, a current deposit count, security options, transportation options and the like. One or more input devices 254 such as a keypad, keyboard, mouse, touchscreen, fingerprint scanner, retinal scanner, proximity card reader, RFID scanner and/or writer, magnetic card reader, barcode reader, and/or combinations thereof, or any other type of input device or reader capable of inputting, reading, or scanning indicia or information, may also be included in or connected to recycler 200. One or printers 256 may also be included in or connected to recycler 200 for printing receipts and notifications as well.

In cash recycler 200, stackers 217 and cartridges 215 are configured to store currency. Currency may be inserted through input slot 209 and withdrawn through withdrawal slot 211. Stackers 217 may be used to store and organize currency based on denomination. For example, all $5 bills may be stored in stacker 2 (i.e., stacker 217B) while all $20 bills may be stored in stacker 3 (i.e., stacker 217C). Cartridges 215A and 215B, on the other hand, may be used to store overflow currency and/or currency for transport. Thus, if stackers 217 become full, additional currency that is deposited into recycler 200 may be stored in an overflow cartridge such as cartridge 215B. One of cartridges 215 may be designated as a transport cartridge that stores currency to be withdrawn from the machine and transported to the bank. Alternatively or additionally, one or more of cartridges 215 may be used as an unfit bill store for currency determined to be defective to a degree that it should be taken out of circulation. Cartridges 215 and stackers 217 may further be removable for easier access or transport.

Scanning unit 207 may be configured to scan each bill or currency that is inserted into recycler 200. Scanning unit 207 may be configured to detect defects, unauthorized reproductions, denomination, type of currency (e.g., which country the currency originates from) and the like. Scanning unit 207 may further be configured to refuse money (either through input slot 209 or withdrawal slot 211) if it cannot be properly recognized or if the currency is deemed to be an unauthorized reproduction. Scanning unit 207 may send such data to processor 201 which may, in turn, save the data in memory 203.

Further, recycler 200 may include one or more mechanical or electromechanical systems (not shown) for automatically transferring currency between stackers 217, cartridges 215, input slot 209 and withdrawal slot 211 in recycler 200. For example, currency may automatically be withdrawn from stackers 217 and directed into cartridge 215A for storage using a series of motorized rollers. In another example, currency stored in cartridge 215A may be withdrawn and organized and stored into stackers 217 according to denomination. Using such systems to facilitate the automated movement of currency between storage components and other portions of recycler 200 may provide efficiency and security by alleviating some of the need to manually handle currency stored within recycler 200.

Figure 3:
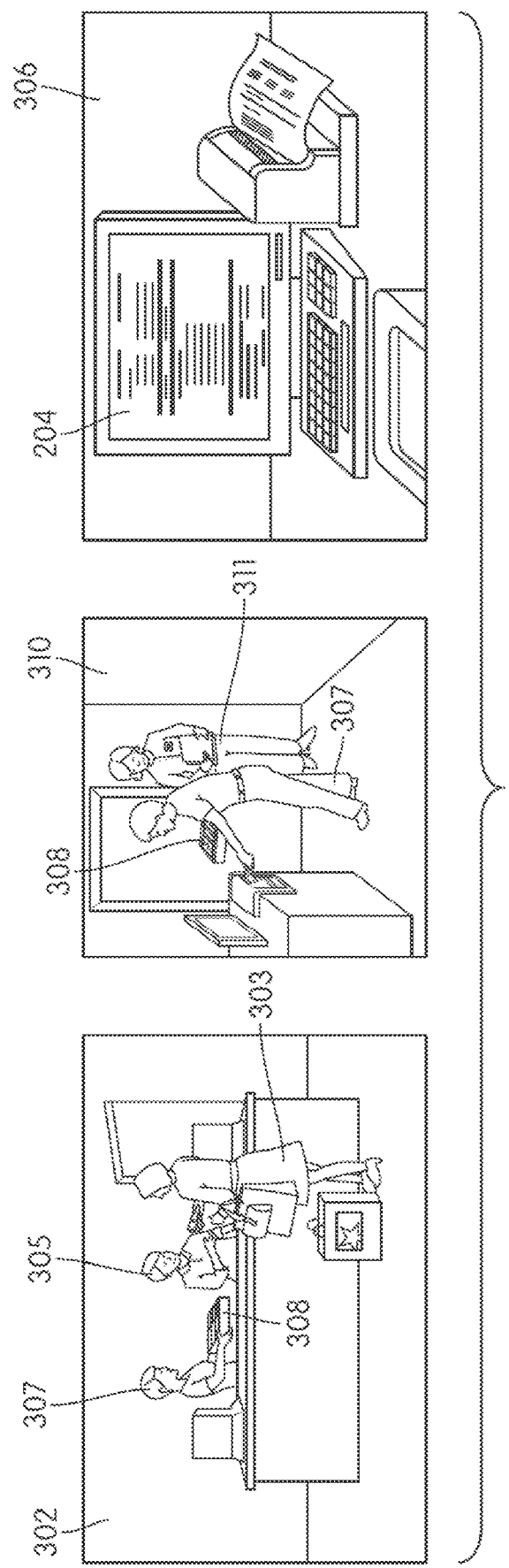
FIG. 3 illustrates various features of a currency recycler that may be used in accordance with one or more aspects described herein.

FIG. 3 illustrates various features of cash recycler, such as cash recycler 200 of FIG. 2, used in various aspects of the invention. The images in FIG. 3 depict use of a single cash recycler 200 in a retail environment. The retail owner may have a cash recycler 200 located in each of their stores. In an aspect of the invention, summary information for the retail owner's stores may be available via an interface to the financial institution. In another embodiment, access to summary information may be available directly from each of the cash recyclers 200.

In FIG. 3, image 302 depicts customer 303 paying cash to a retail employee such as store cashier 305 for a purchase. Another store cashier 307 at a recently closed cash register may be carrying a cash drawer or till 308 to a back office for reconciliation. In image 310, store cashier 307 may load currency from cash register till 308 into cash recycler 200. In addition, store cashier 307 may also deposit other paper forms of payment received from customer such as checks. An office manager 311 may be supervising cashier 307 during the loading of cash register till 308 into cash recycler 200. Moreover, upon the start of a shift a cashier may fill his/her cash register till with a designated amount of currency dispensed from cash recycler 200.

In image 306 of FIG. 3, a display screen (e.g., display 213 of cash recycler 200 of FIG. 2) may show the total amount entered into cash recycler 200 from till 308. The display screen 213 may breakout the amount entered into cash recycler 200 by denomination and by each cashier. The total amount deposited and withdrawn from cash recycler 200 may be shown on display screen 213.

Figure 4:
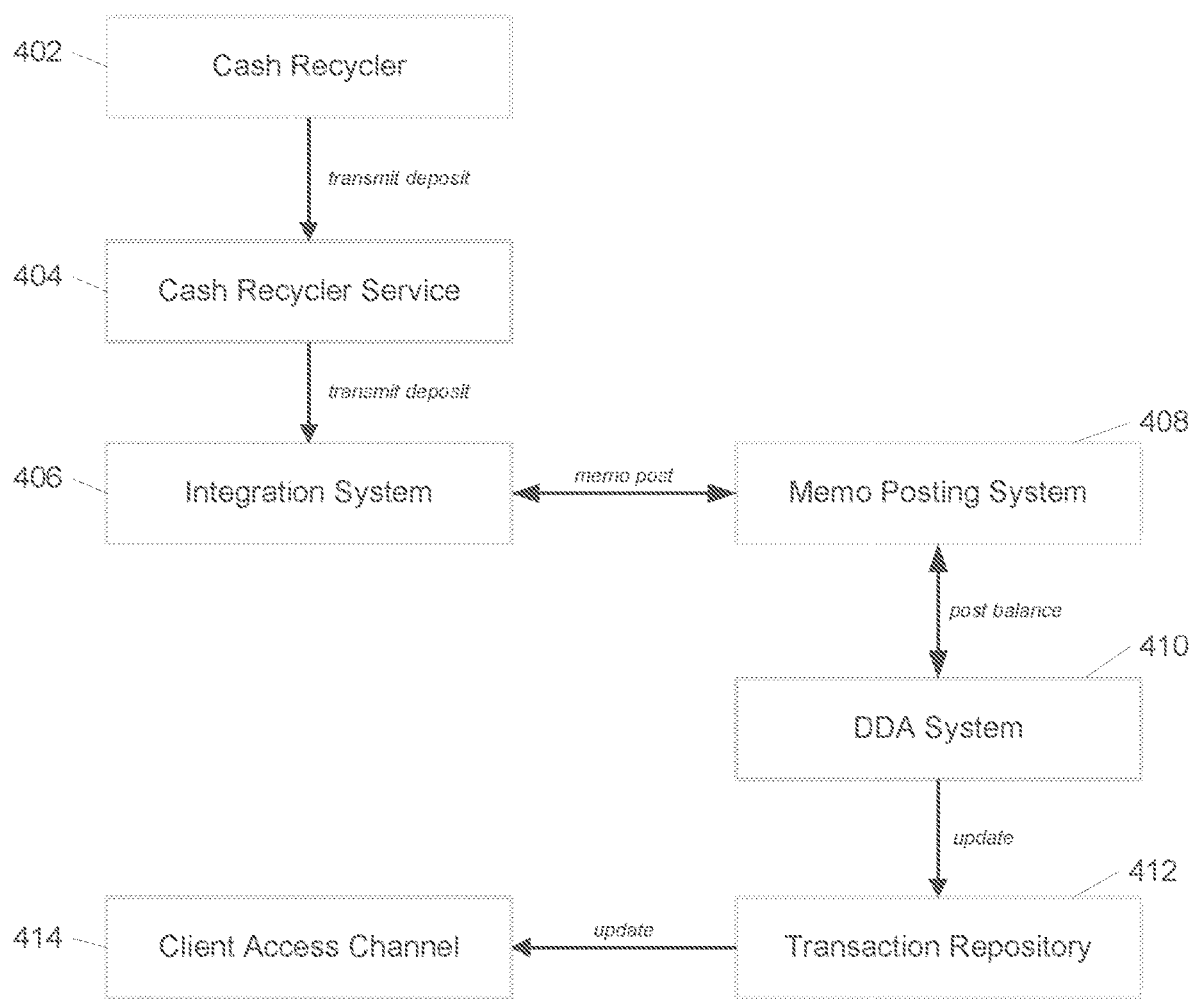
FIG. 4 illustrates additional features of a currency recycler used in one or more aspects described herein.

FIG. 4 illustrates a system configuration that may be used in accordance with an aspect of the invention. In FIG. 4 a cash recycler 402 may communicate information to cash recycler service 404 located at a remote location. For example, cash recycler 402 may communicate deposit and withdrawal information from an enterprise location (e.g., a retail store) to the remote cash recycler service 404. The information may be routed through various networks such as the Internet to reach the cash recycler service. The cash recycler service 404 may be located in the data center of a financial institution. The cash recycler service 404 may communicate with an integration system 406 which provides access to the financial systems and processes. The integration system 406 may communicate with a memo posting system 408 which may perform posting activity. The posting system 408 may update the appropriate DDA (direct deposit account) system 410 to reflect the balance changes in the enterprises account balances. The DDA system 410 may also update a transaction repository 412 for historical and intra-day reporting purposes. An enterprise employee may access information stored in the transaction repository 412 through a client access channel 414 via web browser. Those skilled in the art will realize that the financial institution may allow the enterprise user to access the information stored in the transaction repository via numerous alternative communication methods.

According to one aspect, cash recyclers such as cash recycler 102 (FIG. 1) and 200 (FIG. 2) and other cash handling devices may facilitate real-time recognition of funds. In particular, funds deposited at a recycler or other cash handling device at a client site may be recognized by a bank at the time the deposit is made. Recognition refers to the real credit (i.e., not provisional) of deposited funds into a client's account. In contrast to current systems, there is no delay between a deposit of funds and when the funds and transaction data are submitted to the bank for recognition. Thus, instead of having to wait until the end of the day or another prescheduled time for deposits and/or withdrawals to be recognized by the bank, each deposit is processed for recognition in real-time. Data regarding the withdrawal or deposit transaction may be transmitted through a data network to the bank for recognition and processing. Providing real-time recognition offers may advantages including the ability for a client to withdraw the same currency that was earlier deposited for use in the client's operations, all at the client site and without having to first transport the deposited funds to the bank for recognition. Currency recyclers, recycling management and recognition of funds are further described in U.S. application Ser. No. 11/614,656, entitled "Commercial Currency Handling and Servicing Management," filed on Dec. 21, 2006, the content of which is incorporated herein by reference in its entirety.

Figure 5:
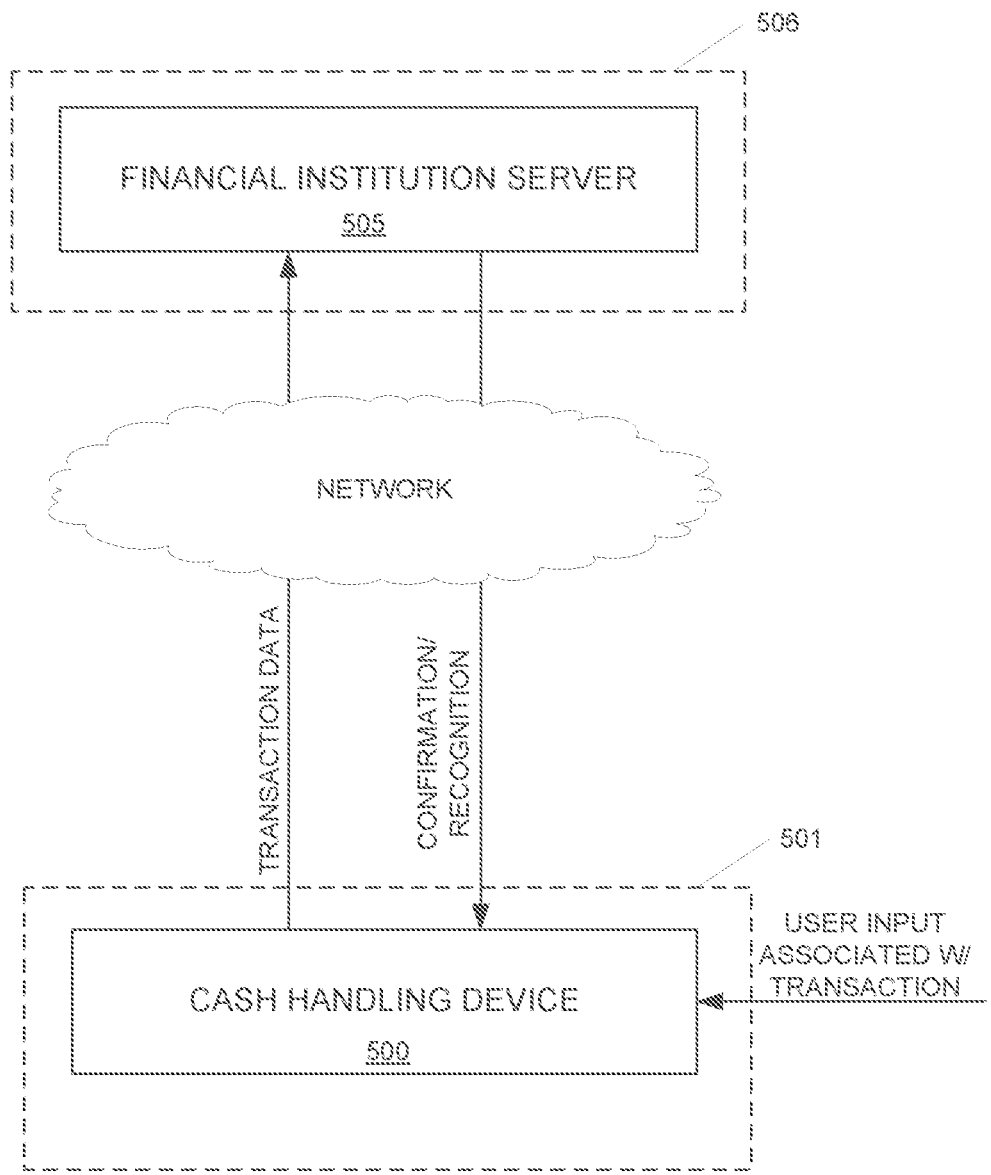
FIG. 5 illustrates a data flow between a financial institution and a cash handling device according to one or more aspects described herein.

Because financial institutions and cash handling devices associated therewith are generally located remote from one another, recognition of funds and transaction processing is typically conducted over data networks. FIG. 5 illustrates a network environment showing a data flow when the network connections are operational. In particular, cash handling device 500 at location 501 may transmit transaction data to a server 505 at financial institution 506 for recognition and approval. For example, if a withdrawal is made at cash handling device 500, the amount of withdrawal, a transaction ID, a cash handling device identifier, an ID of the withdrawing individual and the like may be sent to server 505 for processing and recordkeeping. Similarly, if a deposit is made at cash handling device 500, the deposit amount, time, date and other data may be transmitted to server 505 for immediate recognition as discussed above. In some instances, server 505 of financial institution 506 may respond to the transaction data with confirmation of receipt and/or recognition of the transaction.

In various situations, the network connection between a cash handling device (e.g., device 500) and a financial institution server (e.g., server 505) may be lost. The disruption may be due to one or more nodes in the network path failing, power outages, unavailability of the cash handling device or the financial institution server (e.g., device failure or maintenance) and the like. If the network connection is lost or fails, a business at which the cash handling device is located and being used may be prevented from conducting further transactions. The inability to obtain and deposit funds may adversely affect the operations of the business.

Figure 6:
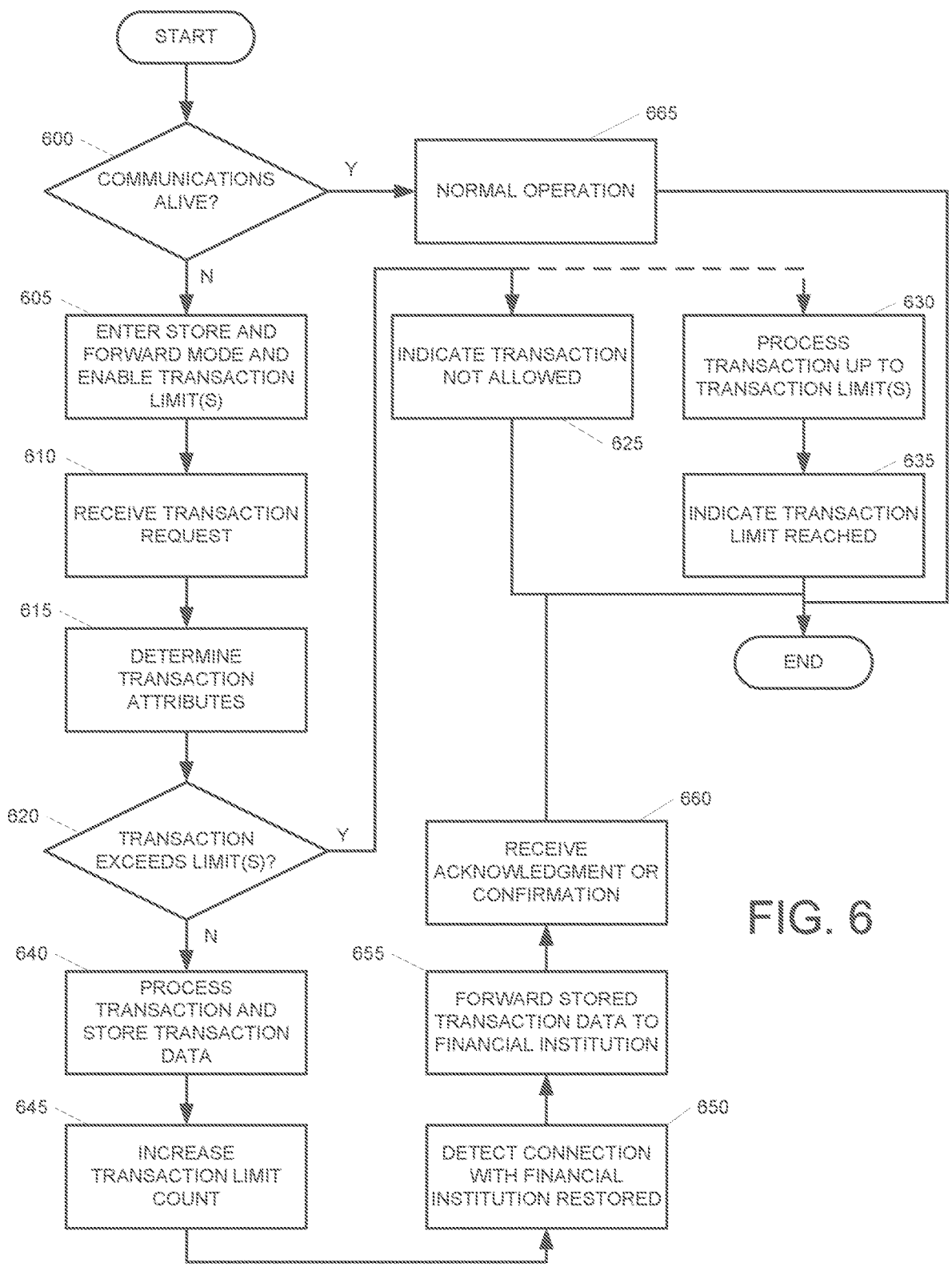
FIG. 6 is a flowchart illustrating a method for activating of one or more transaction limits and storing and forwarding transactions in accordance with one or more aspects described herein.

FIG. 6 is a flowchart illustrating a method by which transactions may continue to be processed at a cash handling device even after communications between the cash handling device and financial institution have been lost. In step 600, for example, a cash handling device may determine whether communications between it and a financial institution server have been lost or are otherwise unavailable. Such a determination may be made by pinging the financial institution at predetermined times (e.g., every 5, 10, 30, 60 seconds). Alternatively, a financial institution server may send a heartbeat signal to the cash handling device and/or vice versa, the detection of which indicating an operational connection. If communications between the cash handling device and the financial server have been lost or are otherwise unavailable, the cash handling device may enter a store and forward mode by enabling one or more transaction limits in step 605. Transaction limits may include a maximum permitted withdrawal amount, a maximum amount of time for processing transactions, limits on users that may perform transactions during the store and forward mode and the like. In one or more arrangements, transaction limits may be defined from the time the store and forward mode is entered (i.e., upon detecting or determining loss of communications between the cash handling device and the financial institution). Thus, if a maximum withdrawal amount is set at $1000, the cash handling device may insure that the total amount of funds withdrawn from the cash handling device after entry into the store and forward mode does not exceed $1000.

Upon entry into the store and forward mode, the cash handling device may receive a transaction request in step 610. For example, the transaction request may be for a withdrawal of funds, an exchange of denominations, a deposit of cash and the like. In step 615, the cash handling device may determine characteristics of the transaction request including attributes such as an amount of the transaction, a transaction type, a transaction request time and the like. The characteristics may be determined based on user input, scanning of deposited funds, an internal clock, among other data sources. In step 620, the cash handling device may determine whether the characteristics of the requested transactions exceed the transaction limits enabled during the store and forward mode. In one example, the cash handling device may determine if a total amount withdrawn since the store and forward mode was activated (or since the loss of connection or unavailability of the financial institution server) would exceed a maximum withdrawal limit if the transaction request was processed. In another example, the cash handling device may determine if a total number of transactions or type of transaction processed since the loss of connection or activation of the store and forward mode exceeds a predefined limit. In yet another example, the cash handling device may apply limits specific to a particular individual or role requesting the transaction.

If the cash handling device determines that the requested transaction, if processed, will exceed the transaction limits, the cash handling device may indicate that the transaction is not allowed because the transaction would cause the device to exceed the limits in step 625. Alternatively, the cash handling device may process the transaction up to the limit in step 630. For example, if a withdrawal amount limit is set and a user requests a withdrawal of an amount that would exceed the limit, the cash handling device may dispense funds up to the limit, then indicate to the user that the limit has been reached, e.g., as in step 635. Optionally, once the transaction limit has been met, the cash handling device may enter a lockdown mode where no other transactions or transactions of a particular type may be requested (e.g., no transactions may be initiated). In one example, no other transaction may be allowed once lockdown mode has been entered. In another example, only deposits may be allowed once the lockdown mode has been engaged.

If, on the other hand, the cash handling device determines that processing of the requested transactions would meet the transaction limits (i.e., would not exceed the limits), the cash handling device may process and store the requested transaction in step 640. Since the transaction data cannot be sent to the financial server for confirmation or acknowledgment, requested transaction data may be stored in memory of the cash handling device. Prior to, during or after processing the transaction, the cash handling device may further increase a count associated with the transaction limits in step 645. For example, the cash handling device may increase the total amount of currency transacted since loss of connection with the financial server by the amount of the requested transaction. In another example, the cash handling device may increase the number of transactions processed by 1.

In step 650, the cash handling device may detect that a connection with the financial server has been restored or that the financial server is now available. For example, the financial server may broadcast a message indicating availability to all cash handling devices. In another example, the cash handling device may receive a ping response that indicates the financial server is available. In response to detecting that communications with the financial server have been reestablished, the cash handling device may forward all of the transactions that have been processed since the loss of connection with or availability of the financial server to the financial server for processing in step 655. The cash handling device may subsequently receive acknowledgment or confirmation of the processed transactions (e.g., acknowledgment of recognition of deposited funds) in step 660. If communications between the cash handling device and the financial institution are alive, as determined in step 600, the cash handling device may operate normally or return to normal operations (i.e., transaction limits might not applied) in step 665.

Figure 7:
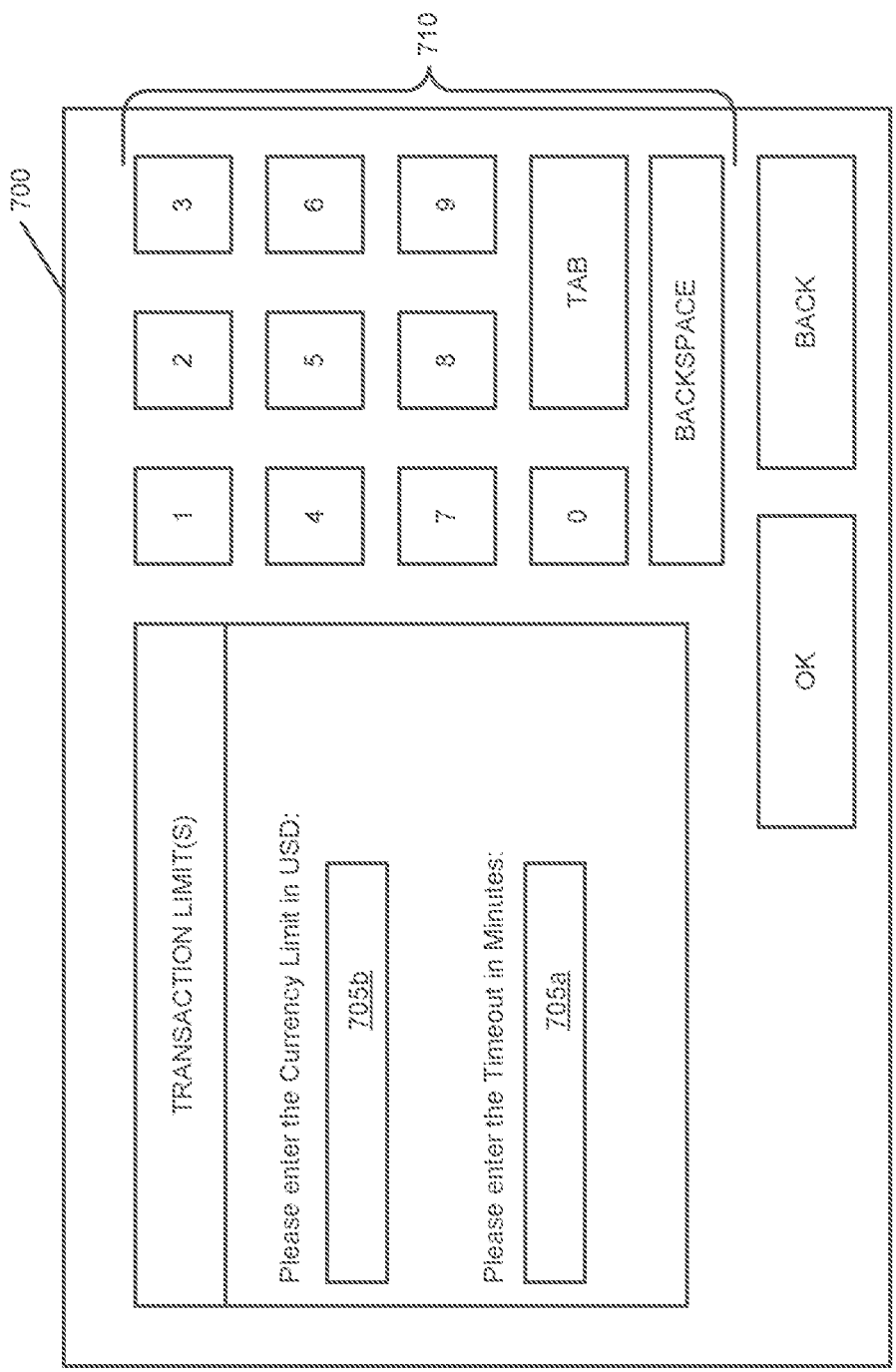
FIG. 7 illustrates a user interface for configuring transaction limits according to one or more aspects described herein.

FIG. 7 illustrates a configuration interface for specifying a dollar amount and time limit for transaction processing after loss of communications with a financial server. Interface 700 includes time limit entry field 705*a* and amount entry field 705*b* and keypad 710 for entry of the limits. Interface 700 might only be available or accessible to a financial institution authorized individual. For example, the client or customer using the cash handling device might not be permitted to configure these limits. Alternatively, a financial institution may allow a management level employee of the client to configure such limits.

Figure 8A:
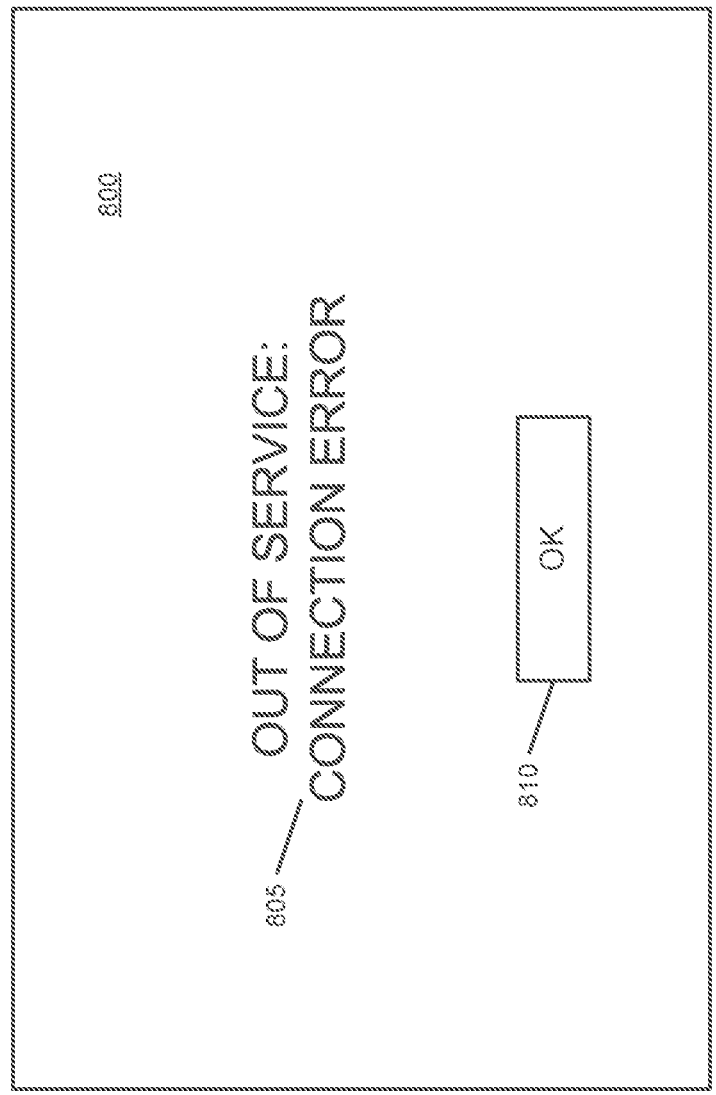
FIG. 8A illustrates a connection error message in accordance with one or more aspects described herein.

FIG. 8A illustrates an out of service message that may be displayed once one or more specified limits have been reached. For example, interface 800 may display a connection error 805 indicating that the connection with the financial institution server has not been restored. The connection error 805 may be displayed until an individual selects an acknowledgment option such as "OK" button 810. Error 805 may be displayed upon login, upon powering up the cash handling device and/or upon returning to an active state from a standby mode.

Figure 8B:
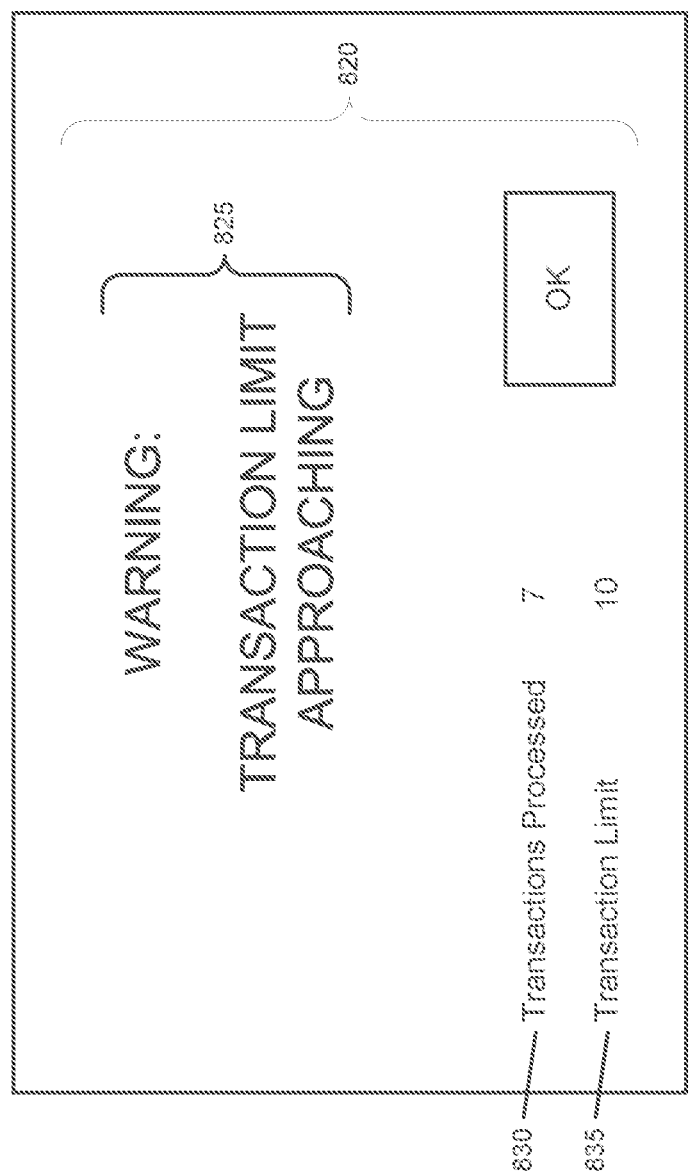
FIG. 8B illustrates a transaction limit warning message in accordance with one or more aspects described herein.

FIG. 8B illustrates a warning message 820 that indicates a transaction limit is close to being exceeded. In addition to warning 825, message 820 may provide additional information such as a number of transactions already processed 830 and a predefined limit on transactions 835 so that a user can determine how many more transactions or an amount of additional funds that may be processed prior to lockdown or shutdown of the device. Alternatively or additionally, the limit may be based on a number of transactions, a dollar amount transacted or to be transacted and/or a time value.

Figure 9:
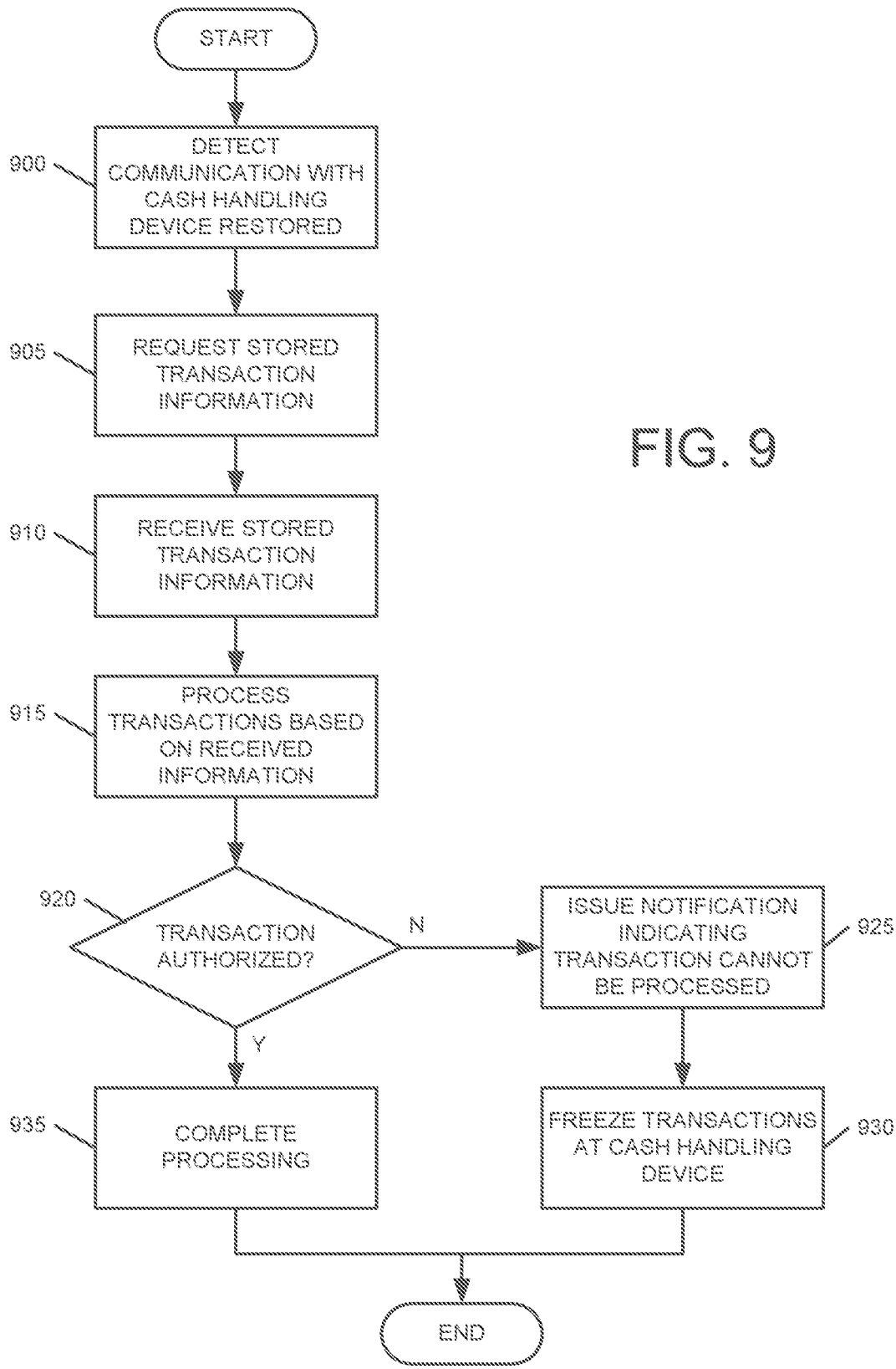
FIG. 9 is a flowchart illustrating processing transaction requests upon restoration of communications with a cash handling device according to one or more aspects described herein.

FIG. 9 is a flowchart illustrating an example method for processing stored transactions received from a cash handling device upon reestablishment of communications. The method may begin at step 900 where a financial institution server may detect that a communication connection with the cash handling device has been restored. In one example, the financial institution server may broadcast a signal on a periodic or aperiodic basis to one or more cash handling devices and receive acknowledgment signals indicating that the signal was received. Accordingly, the financial institution server may determine whether a communication connection between the server and the cash handling device is functional based on whether acknowledgment messages are received in response to the transmitted signals. Upon detecting that communications with the cash handling device have been restored, the financial institution server may request that the cash handling device transmit or forward any stored transactions to the server for processing by the financial institution in step 905.

In step 910, the financial institution may receive one or more stored transactions in response to its request. The financial institution may then process each of the stored transactions and provide subsequent acknowledgment to the cash handling device in step 915. For example, the financial institution may recognize each deposited amount (i.e., credit the depositor's account) and/or debit a withdrawal amount from the depositor's amount in accordance with the parameters of each requested transaction.

In one or more instances, the financial institution may determine whether one or more of the stored transactions is authorized or otherwise can be processed, e.g., as shown in step 920. The determination may be based on whether sufficient funds exist for a withdrawal, whether a deposit limit would be exceeded and the like. If the transaction is authorized, the financial institution may complete processing of the transaction in step 935. If, however, the transaction is not authorized, in step 925, the financial institution may issue a notification to the client cash handling device and/or to the client (e.g., through an e-mail or phone call) indicating that the one or more stored transactions could not be processed and appropriate correction is needed. Additionally, the financial institution may freeze processing of transactions at the cash handling device in step 930 until the issue is resolved. For example, the financial institution server may transmit a freeze signal to the cash handling device, thereby locking the device from further transactions. Alternatively, the financial institution server may refuse to process or acknowledge any transaction requests or data received from the cash handling device until resolution of the issues. In yet another alternative, the financial institution server may allow further transaction processing while attempting to resolve the issues on the side.

According to one or more aspects, transaction limits during a store and forward mode might only apply to one or more types of transactions. For example, a limit on the number of transactions of an amount of funds involved in the transactions might only be enforced against withdrawals. Thus, deposits might still be allowed even when the limits for withdrawals have been met.

Additionally, the methods and features recited herein may further be implemented through any number of computer readable media that are able to store computer readable instructions. Examples of computer readable media that may be used include RAM, ROM, EEPROM, flash memory or other memory technology, CD-ROM, DVD, or other optical disk storage, magnetic cassettes, magnetic tape, magnetic storage and the like.

While illustrative systems and methods described herein embodying various aspects are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or sub-combination with the elements of the other embodiments. It will also be appreciated and understood that modifications may be made without departing from the true spirit and scope of the present invention. The description is thus to be regarded as illustrative instead of restrictive on the present invention.

What is claimed is:

1. A cash recycler system, comprising:
   at least one processor;
   a communication interface; and
   memory storing computer readable instructions that, when executed by the at least one processor, cause the cash recycler system to:
   determine that a network connection between the cash recycler system and a cash recycler service associated with a server is lost, the cash recycler system being located at an enterprise location, and the enterprise location being different from a location of the server;
   responsive to determining that the network connection between the cash recycler system and the cash recycler service associated with the server is lost, initiate a store and forward mode of the cash recycler system;
   after initiating the store and forward mode of the cash recycler system, receive a first transaction request via at least one user interface presented by the cash recycler system;
   determine that the first transaction request received via the at least one user interface presented by the cash recycler system corresponds to a request to receive a deposit;
   based on determining that the first transaction request received via the at least one user interface presented by the cash recycler system corresponds to a request to receive a deposit, process the first transaction request to receive the deposit and store transaction data associated with the deposit;
   after processing the first transaction request, determine that the network connection between the cash recycler system and the cash recycler service associated with the server has been reestablished; and
   based on determining that the network connection between the cash recycler system and the cash recycler service associated with the server has been reestablished, transmit, to the cash recycler service associated with the server, via the communication interface, the transaction data associated with the deposit stored by the cash recycler system.

2. The cash recycler system of claim 1, wherein the memory stores additional computer readable instructions that, when executed by the at least one processor, cause the cash recycler system to:
   after determining that the network connection between the cash recycler system and the cash recycler service associated with the server is lost, receive a second transaction request via at least one user interface presented by the cash recycler system;
   determine that the second transaction request received via the at least one user interface presented by the cash recycler system does not correspond to a request to receive a deposit; and
   based on determining that the second transaction request received via the at least one user interface presented by the cash recycler system does not correspond to a request to receive a deposit, process the second transaction request based on one or more transaction thresholds.

3. The cash recycler system of claim 2, wherein processing the second transaction request based on the one or more transaction thresholds comprises:
   dispensing funds based on the one or more transaction thresholds and based on the second transaction request received via the at least one user interface presented by the cash recycler system while the network connection between the cash recycler system and the cash recycler service associated with the server is lost; and
   storing transaction data associated with the funds dispensed based on the one or more transaction thresholds and based on the second transaction request received via the at least one user interface presented by the cash recycler system while the network connection between the cash recycler system and the cash recycler service associated with the server is lost.

4. The cash recycler system of claim 3, wherein dispensing the funds based on the one or more transaction thresholds and based on the second transaction request received via the at least one user interface presented by the cash recycler system while the network connection between the cash recycler system and the cash recycler service associated with the server is lost comprises dispensing at least some currency that was previously deposited at the cash recycler system.

5. The cash recycler system of claim 2, wherein processing the second transaction request based on the one or more transaction thresholds comprises denying the second transaction request based on the one or more transaction thresholds.

6. The cash recycler system of claim 2, wherein at least one transaction threshold of the one or more transaction thresholds defines a maximum number of withdrawal transactions that the cash recycler system is permitted to process while the network connection between the cash recycler system and the cash recycler service associated with the server is lost.

7. The cash recycler system of claim 2, wherein at least one transaction threshold of the one or more transaction thresholds defines a maximum amount of currency that the cash recycler system is permitted to dispense while the network connection between the cash recycler system and the cash recycler service associated with the server is lost.

8. The cash recycler system of claim 2, wherein at least one transaction threshold of the one or more transaction thresholds defines a maximum amount of time in which the cash recycler system is permitted to process one or more transaction requests while the network connection between the cash recycler system and the cash recycler service associated with the server is lost.

9. The cash recycler system of claim 2, wherein at least one transaction threshold of the one or more transaction thresholds defines one or more limits on which users of the cash recycler system are permitted to input one or more transaction requests to the cash recycler system via the at least one user interface presented by the cash recycler system while the network connection between the cash recycler system and the cash recycler service associated with the server is lost.

10. The cash recycler system of claim 1, wherein the transaction data associated with the deposit stored by the cash recycler system and transmitted by the cash recycler system to the cash recycler service associated with the server via the communication interface causes the cash recycler service associated with the server to recognize the deposit.

11. The cash recycler system of claim 1, wherein the transaction data associated with the deposit stored by the cash recycler system and transmitted by the cash recycler system to the cash recycler service associated with the server via the communication interface causes the cash recycler service associated with the server to recognize the deposit by crediting funds associated with the deposit to a client account associated with an owner of the enterprise location where the cash recycler system is located.

12. The cash recycler system of claim 1, wherein the transaction data associated with the deposit stored by the cash recycler system and transmitted by the cash recycler system to the cash recycler service associated with the server via the communication interface causes the cash recycler service associated with the server to recognize the deposit by applying, to a client account associated with an owner of the enterprise location where the cash recycler system is located, a non-provisional credit for funds associated with the deposit.

13. A method, comprising:
at a cash recycler system comprising at least one processor, memory, and a communication interface:
determining, by the at least one processor, that a network connection between the cash recycler system and a cash recycler service associated with a server is lost, the cash recycler system being located at an enterprise location, and the enterprise location being different from a location of the server;
responsive to determining that the network connection between the cash recycler system and the cash recycler service associated with the server is lost, initiate a store and forward mode of the cash recycler system;
after initiating the store and forward mode of the cash recycler system, receiving, by the at least one processor, a first transaction request via at least one user interface presented by the cash recycler system;
determining, by the at least one processor, that the first transaction request received via the at least one user interface presented by the cash recycler system corresponds to a request to receive a deposit;
based on determining that the first transaction request received via the at least one user interface presented by the cash recycler system corresponds to a request to receive a deposit, processing, by the at least one processor, the first transaction request to receive the deposit and store transaction data associated with the deposit;
after processing the first transaction request, determining, by the at least one processor, that the network connection between the cash recycler system and the cash recycler service associated with the server has been reestablished; and
based on determining that the network connection between the cash recycler system and the cash recycler service associated with the server has been reestablished, transmitting, by the at least one processor, to the cash recycler service associated with the server, via the communication interface, the transaction data associated with the deposit stored by the cash recycler system.

14. The method of claim 13, comprising:
after determining that the network connection between the cash recycler system and the cash recycler service associated with the server is lost, receiving, by the at least one processor, a second transaction request via at least one user interface presented by the cash recycler system;
determining, by the at least one processor, that the second transaction request received via the at least one user interface presented by the cash recycler system does not correspond to a request to receive a deposit; and
based on determining that the second transaction request received via the at least one user interface presented by the cash recycler system does not correspond to a request to receive a deposit, processing, by the at least one processor, the second transaction request based on one or more transaction thresholds.

15. The method of claim 14, wherein processing the second transaction request based on the one or more transaction thresholds comprises:
dispensing funds based on the one or more transaction thresholds and based on the second transaction request received via the at least one user interface presented by the cash recycler system while the network connection between the cash recycler system and the cash recycler service associated with the server is lost; and storing transaction data associated with the funds dispensed based on the one or more transaction thresholds and based on the second transaction request received via the at least one user interface presented by the cash recycler system while the network connection between the cash recycler system and the cash recycler service associated with the server is lost.

16. The method of claim 15, wherein dispensing the funds based on the one or more transaction thresholds and based on the second transaction request received via the at least one user interface presented by the cash recycler system while the network connection between the cash recycler system and the cash recycler service associated with the server is lost comprises dispensing at least some currency that was previously deposited at the cash recycler system.

17. The method of claim 14, wherein processing the second transaction request based on the one or more transaction thresholds comprises denying the second transaction request based on the one or more transaction thresholds.

18. The method of claim 14, wherein at least one transaction threshold of the one or more transaction thresholds defines a maximum number of withdrawal transactions that the cash recycler system is permitted to process while the network connection between the cash recycler system and the cash recycler service associated with the server is lost.

19. The method of claim 14, wherein at least one transaction threshold of the one or more transaction thresholds defines a maximum amount of currency that the cash recycler system is permitted to dispense while the network connection between the cash recycler system and the cash recycler service associated with the server is lost.

20. One or more non-transitory computer-readable media storing instructions that, when executed by a cash recycler system comprising at least one processor, memory, and a communication interface, cause the cash recycler system to:

determine that a network connection between the cash recycler system and a cash recycler service associated with a server is lost, the cash recycler system being located at an enterprise location, and the enterprise location being different from a location of the server;

responsive to determining that the network connection between the cash recycler system and the cash recycler service associated with the server is lost, initiate a store and forward mode of the cash recycler system;

after initiating the store and forward mode of the cash recycler system, receive a first transaction request via at least one user interface presented by the cash recycler system;

determine that the first transaction request received via the at least one user interface presented by the cash recycler system corresponds to a request to receive a deposit;

based on determining that the first transaction request received via the at least one user interface presented by the cash recycler system corresponds to a request to receive a deposit, process the first transaction request to receive the deposit and store transaction data associated with the deposit;

after processing the first transaction request, determine that the network connection between the cash recycler system and the cash recycler service associated with the server has been reestablished; and based on determining that the network connection between the cash recycler system and the cash recycler service associated with the server has been reestablished, transmit, to the cash recycler service associated with the server, via the communication interface, the transaction data associated with the deposit stored by the cash recycler system.

* * * * *